United States Patent [19]
Drutchas, deceased et al.

[11] Patent Number: 4,887,682
[45] Date of Patent: Dec. 19, 1989

[54] METHOD AND APPARATUS FOR NULLIFYING ELECTRICAL OFFSETS IN A TORSION SENSOR

[75] Inventors: Gilbert H. Drutchas, deceased, late of Birmingham, Mich., by Elain M. Drutchas, legal representative; John S. Borza, Sterling Heights, Mich.

[73] Assignee: TRW Inc., Lyndhurst, Ohio

[21] Appl. No.: 142,837

[22] Filed: Jan. 6, 1988

[51] Int. Cl.⁴ .............................................. B62D 5/04
[52] U.S. Cl. .............................. 180/79.1; 364/424.05
[58] Field of Search ................................ 180/79.1, 79; 364/424.01, 424.05

[56] References Cited
U.S. PATENT DOCUMENTS

| | | | |
|---|---|---|---|
| Re. 32,222 | 8/1986 | Drutchas | 180/79.1 |
| 4,414,852 | 11/1983 | McNeill | 73/765 |
| 4,464,409 | 5/1984 | Rawicz et al. | 318/632 |
| 4,509,611 | 4/1985 | Kade et al. | 180/79.1 |
| 4,527,653 | 9/1985 | Agarwal et al. | 180/79.1 |
| 4,580,648 | 4/1986 | Murakami et al. | 180/79.1 |
| 4,598,787 | 9/1986 | Drutchas | 180/79.1 |
| 4,621,327 | 11/1986 | Dolph et al. | 180/79.1 X |
| 4,653,601 | 3/1987 | Nakamura et al. | 180/79.1 |

FOREIGN PATENT DOCUMENTS

| | | | |
|---|---|---|---|
| 81398 | 6/1983 | European Pat. Off. | 180/79.1 |
| 238346 | 9/1987 | European Pat. Off. | 180/79.1 |
| 221967 | 9/1987 | Japan | 180/79.1 |
| 247968 | 10/1987 | Japan | 180/79.1 |

*Primary Examiner*—Mitchell J. Hill
*Attorney, Agent, or Firm*—Tarolli, Sundheim & Covell

[57] ABSTRACT

A method and apparatus is disclosed for nullifying electrical offsets present in an output signal from a torsion sensing device. The apparatus includes a detection circuit for outputting an electrical signal when a change between a no applied torque condition and an applied torque condition occurs in a member whose torsion is being monitored. A sample and hold circuit measures the output signal from the torsion sensing device, the sample and hold circuit being triggered in response to the detection circuit. A differencing circuit subtracts the output of the sample and hold circuit from a "zero torque" reference value and outputs an electrical signal having a value indicative of the difference therebetween. An offset compensating circuit is electrically connected to the output of the differencing circuit and to the torsion sensing device and outputs a modified torsion sensing signal having a value that varies as a function of the applied torque offset by the value of the output of the differencing circuit.

4 Claims, 2 Drawing Sheets

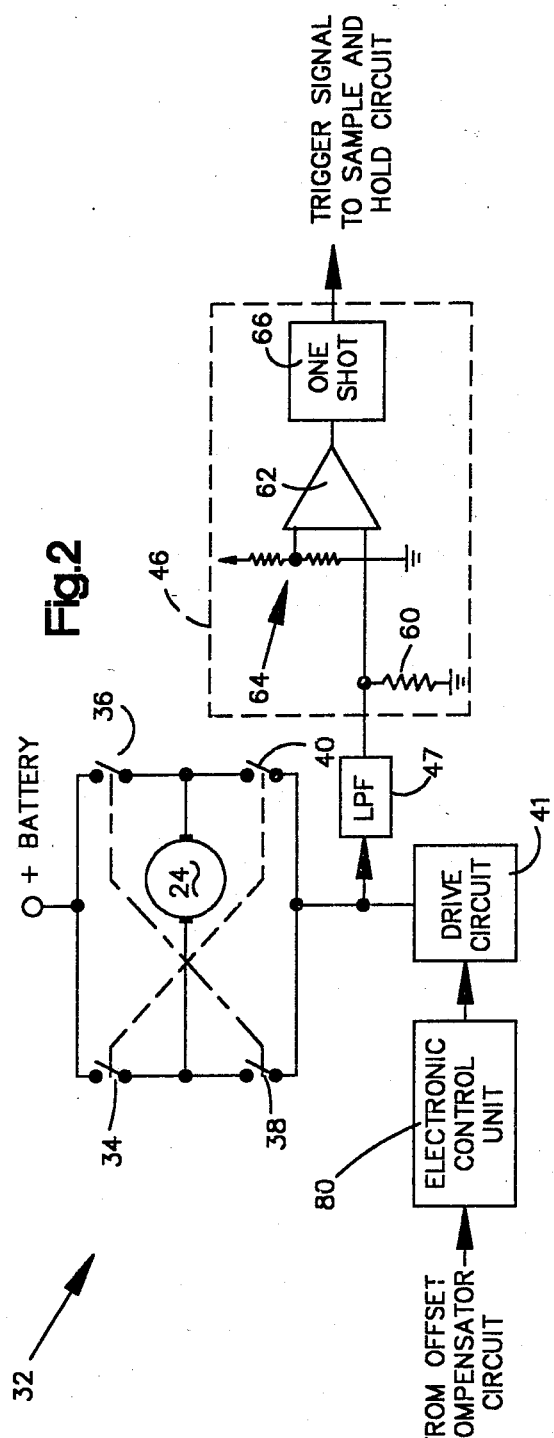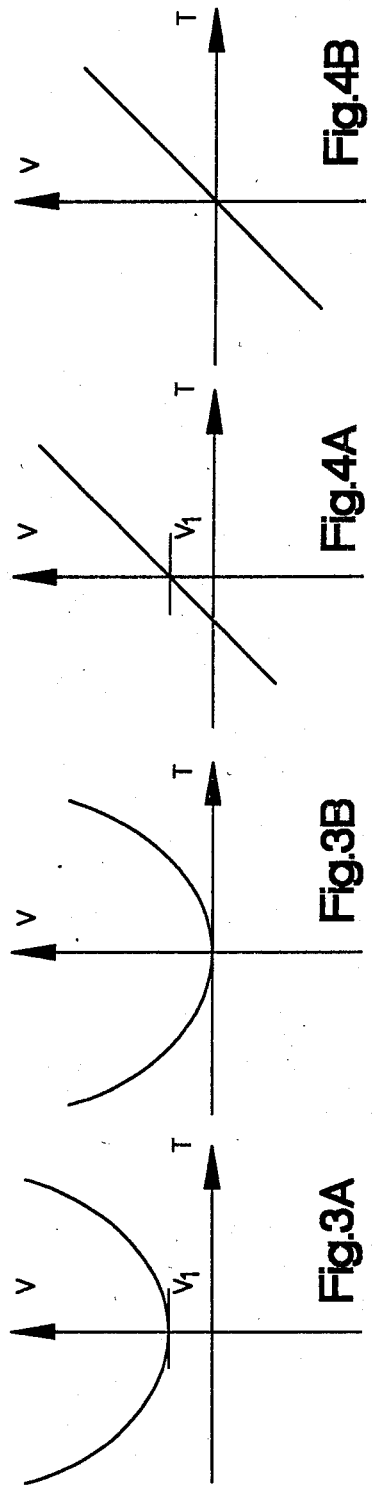

METHOD AND APPARATUS FOR NULLIFYING ELECTRICAL OFFSETS IN A TORSION SENSOR

TECHNICAL FIELD

The present invention relates to a torsion sensor and is particularly directed to a method and apparatus for automatically nullifying electrical offsets present in a torsion sensor output signal.

BACKGROUND OF THE INVENTION

Torque sensors are well known in the art. Such sensors typically produce an electrical signal having an electrical characteristic that varies as a function of torque applied to a member being measured. The output signal from the torque sensor is typically used to control another device. Proper control of the device requires that the electrical characteristic of the torque sensor output signal be at a known quantity when no torque is applied to the member so that applied torque can be accurately measured.

One problem that exists in torque sensors is that its output signal may include an undesired electrical offset. The existence of the electrical offset could result in inefficient or inexact operation of a device which is being controlled in response to the output signal from the torque sensor. The causes of electrical offsets in torque sensors are numerous and diverse. Such electrical offsets could result from misalignment of the elements that make up the torque sensor, temperature effects on the elements, etc. The problem with electrical offsets in torque sensors is of particular concern in the art of vehicle power assist steering systems.

In a vehicle power assist steering system, a torque sensor is used to generate an electrical signal having an electrical characteristic that varies as a function of applied steering torque. A torque sensor for a vehicle power assist system typically includes a position sensor in combination with a torsion bar. The torsion bar resiliently connects two coaxial shaft sections, one shaft section connected to the vehicle steering wheel and the other shaft section connected to a steering member. The position sensor outputs an electrical signal having an amplitude which varies as a function of the relative rotational position between the two shaft sections. Thus, the output signal of the position sensor is indicative of applied steering torque.

The output signal from the position sensor is connected to an electronic control unit ("ECU"). The ECU controls a device, such as an electric assist motor, that provides power assist in response to the output signal from the position sensor. The amount of power assist is, therefore, controlled in response to the sensed steering torque. The proper control of the electric assist motor is dependent upon the accuracy of the output signal from the torque sensor. Due to manufacturing tolerances, misalignment of torque sensor elements can result in the electrical output signal from the torque sensor being offset and therefore, not indicative of the true applied steering torque. Also, temperature variations may effect changes in the output signal of the torque sensor.

U.S. Pat. No. 4,509,611 to Kade et al. uses a torsion sensing device which outputs an electrical signal indicative of the applied steering torque. Ideally, the output signal from the torque sensor is at a mean value when no steering torque is being applied. The torque signal increases or decreases from this mean value depending upon the direction of the applied steering torque. This '611 patent recognizes that a misalignment of the torque sensor elements results in a steady-state error in the signal being outputted by the torque sensor. The steady-state error is determined using a time averaging method which, in one embodiment, takes approximately seven minutes to complete. Once determined, the steady-state error is added to or subtracted from the actual measured torque sensor signal to establish an artificial zero torque reference (ZTR) signal. The long period of time needed to zero the torque sensor of Kade et al '611 is undesirable and presents an obstacle to practical use of the arrangement in a power assist steering system.

SUMMARY OF THE INVENTION

In accordance with the present invention, an apparatus is provided for automatically nullifying electrical offsets present in an electrical output signal from a torsion sensing device. The torsion sensing device outputs an electrical signal having a value that varies in response to torque applied to a member being measured. The apparatus includes means for providing a reference signal. Means is provided for detecting a transition between a no applied torque condition and an applied torque condition in the member and for providing a trigger signal in response thereto. The apparatus further includes measuring means responsive to the trigger signal for providing a measured signal representative of the value of said torsion sensing device output signal at the time when a torque condition transition occurred. Differencing means is provided responsive to the measured signal and to said reference signal for providing a signal having a value indicative of the difference therebetween. The apparatus further includes means responsive to the difference signal and to the output signal from the torsion sensing device for providing a corrected torsion signal having a value representative of the value of the output signal from the torsion sensing device but offset therefrom by the difference signal.

Also, in accordance with the present invention, a method is provided for automatically nullifying electrical offsets present in an electrical output signal from a torsion sensing device. The output signal of the torsion sensing device varies as a function of the torque applied to a member being measured. The method comprises the steps of generating a reference signal, detecting a transition between a no applied torque condition and an applied torque condition in the member and providing a trigger signal in response thereto. The method further includes the steps of measuring the value of the output signal from the torsion sensing device when a transition between a no applied torque condition and an applied torque condition is detected, producing a difference signal having a value indicative of the difference between the measured signal and the reference signal. The method further includes the step of generating a corrected torsion signal having a value representative of the value of the output signal from the torsion sensing device but offset therefrom by the value of the difference signal.

In a preferred embodiment, a mechanical reversing switch assembly, generally of the type fully disclosed in U S. Pat. No. 4,598,787, is operatively coupled across two coaxial steering shaft sections which are resiliently coupled by a torsion bar. The reversing switch electrically connects an electric assist steering motor to a source of electrical energy upon application of applied steering torque. The switch contacts are normally open during a no applied steering torque condition and close upon application of applied steering torque.

A torque sensor is operatively coupled across the torsion bar and outputs an electrical signal indicative of the magnitude of applied torque. A sample and hold circuit is electrically connected to measure the output signal from the torque sensor. A detector circuit monitors the mechanical reversing switch and outputs a trigger signal to the sample and hold circuit upon closure of and/or an opening of a pair of switch contacts of the reversing switch. The sample and hold circuit, when triggered, measures the torque sensor output signal and outputs an electrical signal having a value equal to the value of the output signal from the torque sensor. The sample and hold output signal is updated each time a transition occurs between a no applied torque condition and an applied torque condition.

A reference voltage is generated having a zero torque reference value which is equal to a desired value of the torsion signal at a no applied torque condition. A differencing circuit is electrically connected to both the generated zero torque reference value and to the output of the sample and hold circuit. The differencing circuit outputs an electrical signal having a value equal to the difference therebetween.

An offset compensator circuit is electrically connected to the torsion sensor output and to the output of the differencing circuit. The compensator circuit adds or subtracts a value equal to the output of the differencing circuit to or from the output of the torsion sensor and outputs a corrected torque signal. When no torque is applied to the member, the output of the compensator circuit is equal to the zero torque reference value and varies therefrom responsive to applied steering torque. The electrical output signal from the compensator circuit is indicative of applied steering torque

BRIEF DESCRIPTION OF THE DRAWINGS

Other features and advantages of the present invention will be apparent to those skilled in the art by reference to the following detailed description taken in connection with the accompanying drawings wherein:

FIG. 2 is a schematic diagram of a portion of the system of FIG. 1;

FIGS. 3A and 3B are, respectively, graphical representations of a torque sensor output signal with an electrical offset and a compensated torque sensor output signal with the offset nullified; and FIGS. 4A and 4B are, respectively, graphical representations of a torque sensor output signal with an electrical offset and a compensated torque sensor output signal with the offset nullified.

DESCRIPTION OF A PREFERRED EMBODIMENT

Figure 1:
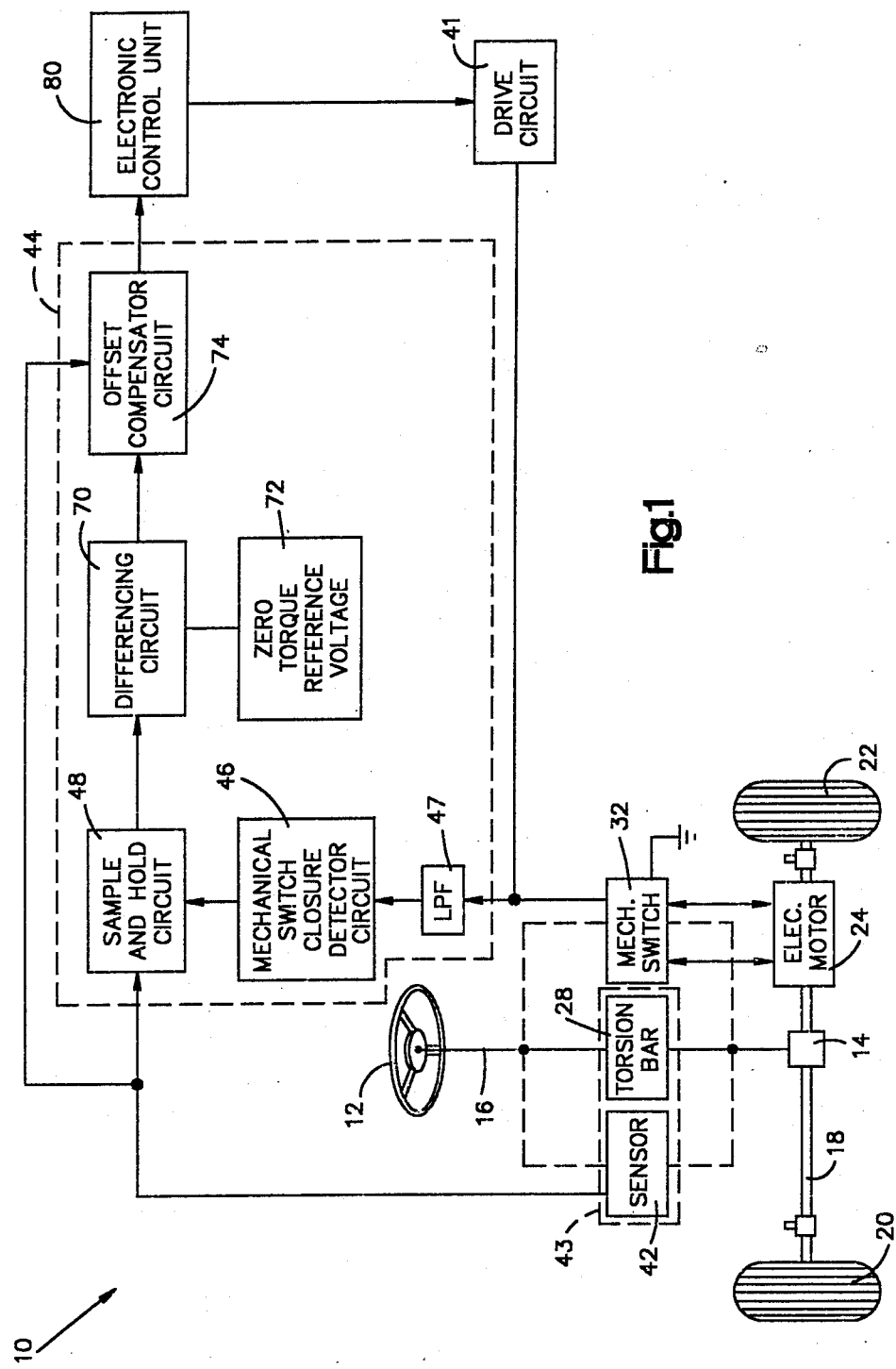
FIG. 1 is a schematic diagram of a power assist steering system incorporating the apparatus of the present invention.

A vehicle power assist steering assembly 10, shown in FIG. 1, includes a steering wheel 12 mechanically coupled to a pinion gear 14 through an input shaft 16 and torsion bar 28. The pinion gear 14 meshingly engages rack teeth disposed on a steering member 18. The steering member 18 is connected to steerable wheels 20, 22 of the vehicle in a known manner. Rotation of the steering wheel 12 causes steering movement of the steerable wheels 20, 22.

An electric assist motor 24 circumscribes the steering member 18 and is drivingly connected thereto through a ball-nut drive assembly (not shown). A power assist steering system having such an electric assist motor and ball-nut drive assembly is fully described in U.S. Pat. No. 4,415,054 to Drutchas, now U.S. Pat. No. Re. 32,222, assigned to the assignee of the present application, the disclosure of which is hereby fully incorporated herein by reference.

A mechanical switch assembly 32 is connected to the input shaft 16 and the pinion gear 14 across the torsion bar 28. As shown in FIG. 2, the assembly 32 includes four mechanically actuatable switches 34, 36, 38, and 40 connected in an "H" network. The switches 34, 36, 38, and 40 are mechanically coupled across the torsion bar 28 in such a fashion that a slight amount of twisting of the torsion bar causes actuation of pairs of the switches.

The four switches are normally open when no torque is applied to the vehicle steering wheel 12. The switches close in pairs upon application of a small amount of steering torque to the steering wheel 12. If steering torque is applied to the steering wheel 12 in one direction, switches 34, 40 close and if steering torque is applied to the steering wheel 12 in the other direction, switches 36, 38 close.

The value of applied torque needed to close the switches is dependent upon the characteristics of the torsion bar and the amount of relative rotation needed to close the switches. As a specific example, for explanation purposes only, the torsion bar may have a 10 in-lb./deg. of deflection characteristic. The switches can be arranged to close upon a ½ deg. relative rotation between the input shaft 16 and the pinion gear 14. Therefore, upon an applied steering torque of 5 in-lb. or greater, switch closure occurs. Any torque less than 5 in-lb. is considered to be a "no applied torque" condition.

The junction of switches 34, 38 is connected to one side of the electric assist motor 24 and the junction of switches 36, 40 is connected to the other side of the electric assist motor 24. The junction of switches 38, 40 is connectable to a drive circuit 41 and the junction of switches 34, 36 is connectable to a source of electrical energy. Such a mechanical switch assembly is fully disclosed in the above-mentioned U.S. Pat. No. 4,598,787 to Drutchas, assigned to the assignee of the present invention, the disclosure of which is hereby fully incorporated herein by reference.

A position sensor 42 (also described in U.S. Pat. No. 4,598,787) is connected to the input shaft 16 and the pinion gear 14 across the torsion bar 28 and provides an electrical signal having a value that varies as a function of the amount of relative rotation between the input shaft 16 and the pinion gear 14. The position sensor 42 in combination with the torsion bar 28 form a torsion sensor 43. The value of the output signal from the sensor 42 varies as a function of the torque applied to the vehicle steering wheel 12.

The sensor 42 is connected to a circuit 44 which nullifies any electrical offset present on the output signal from the sensor 42. The circuit 44 includes a mechanical switch closure detector circuit 46 electrically connected to the mechanical switch assembly 32 through a low-pass filter network 47. A sample and hold circuit 48 has its input connected to the output of the sensor 42 and its trigger input connected to the output of the switch closure detector circuit 46. In accordance with one embodiment of the present invention, the closure detector circuit 46 is designed to output a pulse to trigger the sample and hold circuit 48 each time the mechanical switches change from an open to a closed condition. The detector circuit 46 can be designed to output a pulse to trigger the sample and hold circuit 48 each time the switches 32 change from a closed to an open condition or each time a change occurs between an open and closed condition. The switches of the assembly 32 changing between an open and a closed condition is indicative of a change between a "no applied steering torque" condition and an "applied steering torque" condition. When triggered, the sample and hold circuit measures the output from the sensor 42 and outputs an electrical signal having a value equal to the actual measured value of the output signal from sensor 42.

Referring to FIG. 2, the low-pass filter 47 is electrically connected to the junction of switches 38, 40. The low-pass filter is used to pass the steady-state DC voltage present at the junctions of switches 38, 40 and to filter out voltage changes resulting from switch bounce or changes that occur from pulse width modulating the drive circuit 41. In accordance with one embodiment of the present invention, the detector circuit 46 includes a resistor 60 connected between the output of the low-pass filter 47 and ground. The low-pass filter output is connected to one input of a comparator 62. The other input of comparator 62 is connected to a voltage dividing network 64 so as to provide a reference voltage for this other input.

When no torque is applied to the vehicle steering wheel 12, the input voltage to the comparator 62 from the low-pass filter is equal to ground potential. The output of the comparator 62 is at one state. Upon application of steering torque to the vehicle steering wheel 12, a pair of switches of the mechanical switch 32 close. A voltage is developed across resistor 60 substantially equal to the supply voltage. The reference voltage from network 64 which is inputted to comparator 62 is predetermined such that the comparator output switches to a second state when the voltage across resistor 60 increases due to closure of a pair of switches.

A one shot 66 is connected to the output of comparator 62 and is configured to output an electrical pulse when the comparator output changes from the first state to the second state thereby indicating a switch closure. The output of one shot 66 is connected to the sample and hold circuit 48 and supplies the signal used to trigger the sample and hold. When the sample and hold circuit receives the trigger signal from one shot 66, the torque sensor output signal is measured and the value of the measured signal is outputted in a manner well known in the art. The output of the sample and hold circuit 48 remains constant at that value until another trigger signal is received.

The detector circuit 46 has been described as generating a pulse when a pair of switches of the assembly 32 close. However, the circuit 46 can instead be configured to output a pulse when the switches open or even to generate a pulse both when the switches open and when they close. Updating of the sample and hold output at both switch opening and closing is acceptable but unnecessary; updating at only switch opening or switch closing is adequate.

The signal measured and held by the sample and hold circuit 48 is outputted to a differencing circuit 70. The differencing circuit 70 is also connected to a zero torque reference voltage source 72. Source 72 generates a reference voltage having a value equal to a desired value of the torsion sensor signal for a no applied steering torque condition.

The differencing circuit 70 subtracts the signal appearing at the output of the sample and hold circuit 48 from the zero torque reference signal to thereby generate a difference signal. The difference signal may be positive or negative, depending upon which input signal was larger. The output of the differencing circuit 70 is electrically connected to an offset compensating circuit 74. The offset compensating circuit 74 is also operatively connected to the output of the sensor 42. The compensator circuit 74 adds the sensor signal and the difference signal to thereby generate an offset compensated signal. The offset compensated signal varies in accordance with variations in the output of the sensor 42.

The operation of the circuit 44 can be better understood by referring to FIGS. 3A, 3B and FIGS. 4A, 4B. FIG. 3A depicts the output voltage ("V") from the sensor 42 as a function of applied steering torque ("T"). Assume the torque sensor has been designed so that the voltage versus torque curve should pass through the origin; i.e., the output voltage from the sensor should be equal to zero volts when the applied steering torque equals zero. Assume further that the curve could become offset from the origin. FIG. 3A shows an offset equal to a voltage value $V_1$ from a desired curve. Such an offset could, for example, be caused from temperature effects on elements of the sensor 42.

When steering torque is first applied to the steering wheel 12, a pair of switches in the assembly 32 closes which results in the triggering of the sample and hold circuit 48. The sample and hold circuit 48 outputs a DC voltage equal to $V_1$. The zero torque reference voltage is set at zero volts DC since that is the desired torque output signal for a no applied steering torque condition. The differencing circuit 70 subtracts the output from the sample and hold circuit 48 from the zero reference voltage 72 and outputs an electrical signal indicative of the difference. The output of differencing circuit 70 in the present example has a value equal to $-V_1$. The offset compensator circuit adds the difference signal (i.e., adds $-V_1$) to the value of the output of sensor 42. The resultant voltage versus torque curve is depicted in FIG. 3B.

Each time the switches of the assembly 32 change from an open to a closed condition, the value used by the circuit 74 is updated. Therefore, any changes in the output of sensor 42 that varies over time, such as temperature effects, are compensated for upon the next application of steering torque.

Referring to FIG. 4A, a graph depicts the output voltage of a torque sensor as a function of applied steering torque. The torque sensor is designed so that its output varies linearly with variations in the applied steering torque. Assume that the output voltage of the torque sensor is further designed so that the voltage versus torque curve should pass through the origin, i.e., the output voltage from the sensor should be equal to zero volts when the applied steering torque equals zero. The curve depicted in FIG. 4A depicts an electrical offset resulting from a misalignment of the sensor elements which shifts the curve to the left. In the same manner as described above, the sample and hold circuit 48 is triggered when switch closure is detected by circuit 46. The zero torque reference signal is zero volts. The differencing circuit would subtract the sample and hold output from the zero torque reference value and output a signal indicative of $-V_1$. The offset compensator circuit 74 adds the $-V_1$ to the sensor output resulting in the curve depicted in FIG. 4B.

It will be appreciated by those skilled in the art that the curve depicted in FIG. 4A would look similar if electrical offsets was caused by temperature effects. Also, the curve depicted in FIG. 4A could have resulted from a combination of misaligned elements and temperature effects. The resultant correction depicted in FIG. 4B would be the same in either case.

It will therefore be appreciated that the circuit 44 will nullify electrical offsets due to temperature effects in a torque sensor that outputs a nonlinear output voltage versus applied steering torque curve. Circuit 44 will nullify electrical offsets due to both temperature effects and misaligned sensor elements in a torque sensor that outputs a linear output voltage versus applied steering torque curve. Also, if electrical offset in a linear torque signal is caused by improper switch closing, e.g., nonsymmetric closing about the zero torque condition, the circuit 44 will nullify the offset.

It will be appreciated that one could provide a nonlinear torque output signal to an electronic controller based on a linear torque signal in which electrical offsets had been nullified. In such a system, a linear torque sensor would be used to output a linear signal indicative of applied steering torque. The signal would be processed by the circuit 44 to nullify any electrical offsets that may be present. The output of circuit 44 would be connected to a final processing circuit. The final processing circuit would provide the desired nonlinear torque signal based on the compensated torque signal outputted from the circuit 44.

The output signal from the compensator circuit 74 is connected to an electronic control unit ("ECU") 80 which is, in turn, connected to the drive circuit 41. The ECU 80 controls the drive circuit 41 in response to the output signal from the compensator circuit 74. The drive circuit 41 includes an FET electrically connected to the junction of the mechanical switches 38, 40 and electrical ground. The ECU controls the FET so as to vary the amount of electrical current flowing through the electric assist motor. The ECU thereby varies the amount of power assist in response to the compensated torsion signal outputted from the compensator circuit 74.

This invention has been described with reference to preferred embodiments. Modifications and alterations may occur to others upon reading and understanding this specification. It is our intention to include all such modifications and alternations insofar as they come within the spirit and scope of the appended claims.

Having described a preferred embodiment of the invention, the following is claimed:

1. A power assist steering system having a vehicle steering wheel operatively connected to steerable wheels of the vehicle through a torsion bar, applied steering torque twisting the torsion bar, said power steering system including:

power assist means operatively connected to vehicle steering linkage for, when energized, providing power assist to an operator applied steering maneuver;

an electrical control signal having a value;

drive circuit means for energizing said power assist means in response to said value of said electrical control signal;

torsion sensing means for providing an electrical torsion signal having a value that varies as a function of applied steering torque;

means for detecting when no steering torque is applied and when steering torque is applied, said detecting means providing a first electrical signal when steering torque is applied and a second electrical signal when no steering torque is applied;

means responsive to said detecting means for measuring a value of said electrical torsion signal from said torsion sensor when the signal provided by said detecting means changes between said first electrical signal and said second electrical signal and for providing an output signal having a value indicative of the measured value of said electrical torsion signal;

means for providing a zero torque reference voltage having a predetermined value;

means for comparing said output signal from the measuring means against said value of said zero torque reference voltage and for providing an electrical output signal having a value equal to the difference therebetween;

compensating circuit means electrically connected to said torsion sensing means and said means for comparing, said compensating circuit means providing an electrical, compensated torsion signal having a value equal to the value of said electrical torsion sensing signal from said torsion sensing means offset by the value of the electrical output signal from said means for comparing; and control circuit means electrically connected to said compensating circuit means and to said drive circuit means for providing said electrical control signal having a value responsive to the output signal of the compensating circuit means.

2. The power assist steering system of claim 1 wherein said power assist means is an electric motor.

3. The power assist steering system of claim 1 wherein said detecting means including a reversing switch connected to said drive circuit means and to said power assist means, means for closing a pair of switch contacts upon application of steering torque, means for monitoring switch closure and switch opening, and means for providing said first electrical signal when the switch contacts close and said second electrical signal when no switch contacts are closed.

4. The power assist steering system of claim 1 wherein said measuring means is a sample and hold circuit.

* * * * *